(12) United States Patent
Stern

(10) Patent No.: US 9,874,951 B2
(45) Date of Patent: Jan. 23, 2018

(54) STYLUS FOR OPERATING A DIGITIZER SYSTEM

(71) Applicant: Microsoft Technology Licensing, LLC, Redmond, WA (US)

(72) Inventor: Yuval Stern, Even-Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 14/930,815

(22) Filed: Nov. 3, 2015

(65) Prior Publication Data

US 2016/0124530 A1   May 5, 2016

Related U.S. Application Data

(60) Provisional application No. 62/075,286, filed on Nov. 5, 2014, provisional application No. 62/074,098, filed on Nov. 3, 2014.

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
None
See application file for complete search history.

(56) References Cited

U.S. PATENT DOCUMENTS

| 4,111,052 | A | 9/1978 | Sniderman |
|---|---|---|---|
| 4,451,698 | A | 5/1984 | Whetstone et al. |
| 4,672,154 | A | 6/1987 | Rodgers et al. |
| 5,004,872 | A | 4/1991 | Lasley |
| 5,138,118 | A | 8/1992 | Russell |
| 5,225,637 | A | 7/1993 | Rodgers et al. |
| 5,414,227 | A | 5/1995 | Schubert et al. |
| 5,528,002 | A | 6/1996 | Katabami |
| 5,565,632 | A | 10/1996 | Ogawa |
| 5,571,997 | A | 11/1996 | Gray et al. |
| 5,576,502 | A | 11/1996 | Fukushima et al. |
| 5,581,052 | A | 12/1996 | Padula et al. |
| 5,793,360 | A | 8/1998 | Fleck et al. |
| 5,914,708 | A | 6/1999 | LaGrange et al. |
| 6,104,388 | A | 8/2000 | Nagai et al. |

(Continued)

FOREIGN PATENT DOCUMENTS

| EP | 0209467 | 1/1987 |
|---|---|---|
| EP | 2818981 | 12/2004 |

(Continued)

OTHER PUBLICATIONS

Official Action Dated Feb. 22, 2016 From the U.S. Patent and Trademark Office Re. U.S. Appl. No. 14/839,985.

(Continued)

*Primary Examiner* — Duane N Taylor, Jr.

(57) ABSTRACT

An apparatus includes a housing, a tip configured to move with respect to the housing based on contact pressure applied the tip, and a circuit. The circuit detects pressure applied on the tip based on movement of the tip. The circuit includes a variable current source configured to drive a sensor, a transimpedance amplifier (TIA) configured to receive current from the sensor and an analog to digital converter configured to sample output from the TIA.

17 Claims, 12 Drawing Sheets

(56) References Cited

U.S. PATENT DOCUMENTS

| | | |
|---|---|---|
| 6,175,773 B1 | 1/2001 | Reiffel et al. |
| 6,211,863 B1 | 4/2001 | Chery et al. |
| 6,232,962 B1 | 5/2001 | Davis et al. |
| 6,249,234 B1 | 6/2001 | Ely et al. |
| 6,344,656 B1 | 2/2002 | Hopkins et al. |
| 6,474,888 B1 | 11/2002 | Lapstun et al. |
| 6,624,832 B1 | 9/2003 | Thomas |
| 6,690,156 B1 | 2/2004 | Weiner et al. |
| 6,707,451 B1 | 3/2004 | Nagaoka |
| 6,727,439 B2 | 4/2004 | Chao et al. |
| 6,853,369 B2 | 2/2005 | Fukushima et al. |
| 6,972,754 B2 | 12/2005 | Zank |
| 7,145,555 B2 | 12/2006 | Taylor et al. |
| 7,202,862 B1 | 4/2007 | Palay et al. |
| 7,210,046 B2 | 4/2007 | Truong |
| 7,279,646 B2 | 10/2007 | Xu |
| 7,292,229 B2 | 11/2007 | Morag et al. |
| 7,367,242 B2 | 5/2008 | Xi et al. |
| 7,372,455 B2 | 5/2008 | Perski et al. |
| 7,436,397 B2 | 10/2008 | Zank |
| 7,778,795 B2 | 8/2010 | Fukushima et al. |
| 7,843,439 B2 | 11/2010 | Perski et al. |
| 7,955,017 B2 | 6/2011 | Lapstun et al. |
| 8,199,132 B1 | 6/2012 | Oda et al. |
| 8,212,795 B2 | 7/2012 | Henry |
| 8,228,299 B1 | 7/2012 | Maloney et al. |
| 8,481,872 B2 | 7/2013 | Zachut |
| 8,536,471 B2 | 9/2013 | Stern et al. |
| 8,629,358 B2 | 1/2014 | Rimon et al. |
| 8,686,964 B2 | 4/2014 | Rimon |
| 8,780,089 B2 | 7/2014 | Yuan et al. |
| 8,878,823 B1 | 11/2014 | Kremin et al. |
| 9,063,591 B2 | 6/2015 | Alameh et al. |
| 9,116,558 B2 | 8/2015 | Yilmaz et al. |
| 9,122,322 B2 | 9/2015 | Stern et al. |
| 9,158,393 B2 | 10/2015 | Vlasov |
| 9,218,073 B1 | 12/2015 | Kremin et al. |
| 2002/0040817 A1 | 4/2002 | LeKuch et al. |
| 2004/0001052 A1 | 1/2004 | Zank |
| 2005/0110777 A1 | 5/2005 | Geaghan et al. |
| 2005/0166076 A1 | 7/2005 | Truong |
| 2005/0195387 A1* | 9/2005 | Zhang ............ G01B 11/002 356/138 |
| 2006/0068851 A1 | 3/2006 | Ashman, Jr. |
| 2006/0109252 A1 | 5/2006 | Kolmykov-Zotov et al. |
| 2006/0267966 A1 | 11/2006 | Grossman et al. |
| 2007/0014490 A1 | 1/2007 | Silverbrook et al. |
| 2007/0085836 A1 | 4/2007 | Ely |
| 2007/0146351 A1 | 6/2007 | Katsurahira et al. |
| 2007/0176909 A1 | 8/2007 | Pavlowski |
| 2008/0128180 A1 | 6/2008 | Perski et al. |
| 2009/0078476 A1 | 3/2009 | Rimon et al. |
| 2009/0114459 A1 | 5/2009 | Fukushima et al. |
| 2009/0122029 A1 | 5/2009 | Sin |
| 2009/0262637 A1 | 10/2009 | Badaye et al. |
| 2009/0289922 A1 | 11/2009 | Henry |
| 2010/0006350 A1 | 1/2010 | Elias |
| 2010/0051356 A1 | 3/2010 | Stern et al. |
| 2010/0084203 A1 | 4/2010 | Peng |
| 2010/0107770 A1 | 5/2010 | Serban et al. |
| 2010/0155153 A1 | 6/2010 | Zachut |
| 2010/0214252 A1 | 8/2010 | Wu |
| 2011/0090146 A1 | 4/2011 | Katsurahira |
| 2012/0050231 A1 | 3/2012 | Westhues et al. |
| 2012/0228039 A1 | 9/2012 | Hinson et al. |
| 2012/0253699 A1 | 10/2012 | Kuno |
| 2012/0327040 A1 | 12/2012 | Simon et al. |
| 2013/0141398 A1 | 6/2013 | Cho et al. |
| 2013/0265265 A1 | 10/2013 | Stern |
| 2013/0321355 A1 | 12/2013 | Teiblum |
| 2014/0002422 A1 | 1/2014 | Stern et al. |
| 2014/0019070 A1 | 1/2014 | Dietz et al. |
| 2014/0132529 A1 | 5/2014 | Jeong |
| 2014/0210781 A1 | 7/2014 | Stern |
| 2014/0218343 A1 | 8/2014 | Hicks et al. |
| 2015/0054757 A1 | 2/2015 | Kuroda |
| 2015/0070316 A1 | 3/2015 | Oda et al. |
| 2015/0070330 A1 | 3/2015 | Stern |
| 2015/0116289 A1 | 4/2015 | Stern et al. |
| 2015/0370354 A1 | 12/2015 | Stern et al. |
| 2016/0231833 A1 | 8/2016 | Gu et al. |
| 2017/0045961 A1 | 2/2017 | Stern |
| 2017/0045962 A1 | 2/2017 | Stern et al. |
| 2017/0068345 A1 | 3/2017 | Barel |

FOREIGN PATENT DOCUMENTS

| | | |
|---|---|---|
| EP | 2187288 | 5/2010 |
| EP | 2204724 | 7/2010 |
| EP | 2339432 | 6/2011 |
| EP | 1349056 | 7/2011 |
| EP | 2650758 | 10/2013 |
| JP | 6-119101 | 4/1994 |
| JP | 03-327056 | 9/2002 |
| WO | WO 01/24157 | 4/2001 |
| WO | WO 02/41129 | 5/2002 |
| WO | WO 2009/143046 | 11/2009 |
| WO | WO 2010/086035 | 8/2010 |
| WO | WO 2012/123951 | 9/2012 |
| WO | WO 2013/160887 | 10/2013 |
| WO | WO 2015/027017 | 2/2015 |
| WO | WO 2014/043239 | 3/2015 |
| WO | WO 2016/020818 | 2/2016 |

OTHER PUBLICATIONS

Communication Relating to the Results of the Partial International Search Dated Jul. 25, 2012 From the International Searching Authority Re. Application No. PCT/IL2012/050095.
International Preliminary Report on Patentability Dated Sep. 26, 2013 From the International Bureau of WIPO Re. Application No. PCT/IL2012/050095.
International Search Report and the Written Opinion Dated Mar. 6, 2014 From the International Searching Authority Re. Application No. PCT/IL2013/050836.
International Search Report and the Written Opinion Dated Sep. 7, 2012 From the International Searching Authority Re. Application No. PCT/IL2012/050095.
Notice of Allowance Dated Feb. 3, 2015 From the U.S. Patent and Trademark Office Re. U.S. Appl. No. 13/908,063.
Notice of Allowance Dated Mar. 22, 2013 From the U.S. Patent and Trademark Office Re. U.S. Appl. No. 12/546,753.
Notice of Allowance Dated Apr. 24, 2015 From the U.S. Patent and Trademark Office Re. U.S. Appl. No. 14/005,308.
Official Action Dated Jul. 3, 2012 From the U.S. Patent and Trademark Office Re. U.S. Appl. No. 12/546,753.
Official Action Dated Jun. 3, 2014 From the U.S. Patent and Trademark Office Re. U.S. Appl. No. 13/908,063.
Official Action Dated Dec. 19, 2013 From the U.S. Patent and Trademark Office Re. U.S. Appl. No. 13/908,063.
Official Action Dated Oct. 19, 2012 From the U.S. Patent and Trademark Office Re. U.S. Appl. No. 12/546,753.
Official Action Dated Nov. 25, 2014 From the U.S. Patent and Trademark Office Re. U.S. Appl. No. 14/005,308.
Official Action Dated Jan. 31, 2012 From the U.S. Patent and Trademark Office Re. U.S. Appl. No. 12/546,753.
Hoffman "Not All Tablet Styluses Are Equal: Capacity, Wacom, and Bluetooth Explained", How-to-Geek, 4 P., Sep. 12, 2013.
IBM "Automatic Switching Stylus for Pen-Based Computer Systems", IBM Technical Disclosure Bulletin, XP000419075, 36(12): 583-584, Dec. 1, 1993.
Jones "Stylus Reviews: TrueGlide Apex Review", iPad for Artists, 4 P., Nov. 21, 2013.
Official Action Dated May 5, 2016 From the U.S. Patent and Trademark Office Re. U.S. Appl. No. 14/395,837.
Official Action Dated May 6, 2016 From the U.S. Patent and Trademark Office Re. U.S. Appl. No. 14/451,448.
Invitation to Pay Additional Fees Dated May 31, 2016 From the International Preliminary Examining Authority Re. Application No. PCT/IB2015/055863.

(56) References Cited

OTHER PUBLICATIONS

Advisory Action Before the Filing of an Appeal Brief Dated Sep. 15, 2016 From the U.S. Patent and Trademark Office Re. U.S. Appl. No. 14/395,837.
Written Opinion Dated Sep. 2, 2016 From the International Preliminary Examining Authority Re. Application No. PCT/IB2015/055863.
International Preliminary Report on Patentability Dated Oct. 19, 2016 From the International Preliminary Examining Authority Re. Application No. PCT/IB2015/055863.
International Search Report and the Written Opinion Dated Nov. 21, 2016 From the International Searching Authority Re. Application No. PCT/US2016/045661. (13 Pages).
Official Action Dated Dec. 19, 2016 From the U.S. Patent and Trademark Office Re. U.S. Appl. No. 14/848,527. (34 pages).
Official Action Dated Jan. 20, 2017 From the U.S. Patent and Trademark Office Re. U.S. Appl. No. 15/335,517. (15 pages).
Restriction Official Action Dated Feb. 17, 2017 From the U.S. Patent and Trademark Office Re. U.S. Appl. No. 14/702,726. (6 pages).
Official Action Dated Mar. 24, 2017 From the U.S. Patent and Trademark Office Re. U.S. Appl. No. 14/702,726. (48 pages).
Communication Relating to the Results of the Partial International Search Dated Oct. 13, 2015 From the International Searching Authority Re. Application No. PCT/IB2015/055863.
International Preliminary Report on Patentability Dated Nov. 6, 2014 From the International Bureau of WIPO Re. Application No. PCT/IL2012/050143.
International Search Report and the Written Opinion Dated Jan. 16, 2013 From the International Searching Authority Re. Application No. PCT/IL2012/050143.
International Search Report and the Written Opinion Dated Jan. 26, 2016 From the International Searching Authority Re. Application No. PCT/IB2015/055863.
Official Action Dated Oct. 8, 2015 From the U.S. Patent and Trademark Office Re. U.S. Appl. No. 14/395,837.
Official Action Dated Oct. 21, 2015 From the U.S. Patent and Trademark Office Re. U.S. Appl. No. 14/451,448.
Song et al. "Grips and Gestures on a Multi-Touch Pen", Proceedings of the SIGCHI Conference on Human Factors in Computing Systems, CHI'11, Session: Flexible Grips & Gestures, Vancouver, BC, Canada, May 7-12, 2011, p. 1323-1332, May 2011.
Official Action Dated Apr. 12, 2017 From the U.S. Patent and Trademark Office Re. U.S. Appl. No. 15/338,549. (43 pages).

\* cited by examiner

STYLUS FOR OPERATING A DIGITIZER SYSTEM

RELATED APPLICATIONS

This application claims the benefit of priority under 35 USC §119(e) of U.S. Provisional Patent Application Nos. 62/075,286, filed on Nov. 5, 2014 and 62/074,098, filed on Nov. 3, 2014. The contents of the above applications are all incorporated by reference as if fully set forth herein in their entirety.

BACKGROUND

Styluses are known in the art for use and control of a digitizer. Position detection of the stylus provides input to a computing device associated with the digitizer and is interpreted as user command. Position detection is performed while the stylus tip is either touching and/or hovering over a detection surface of the digitizer. Often, the digitizer is integrated with a display screen and a position of the stylus over the screen is correlated with virtual information portrayed on the screen.

Some styluses are pressure sensitive, e.g., sense and optionally report a level of pressure applied at a tip of the stylus by a user using the stylus. The computing platform associated with the stylus or any application executed thereon may then use this information. For example, a graphic application may draw thicker lines or darker shades in response to higher pressure levels than in response to lower pressure levels.

BRIEF DESCRIPTION OF THE SEVERAL VIEWS OF THE DRAWINGS

Some examples of the disclosure are herein described, with reference to the accompanying drawings. With specific reference now to the drawings in detail, it is stressed that the particulars shown are by way of example and for purposes of illustrative discussion of examples of the disclosure. In this regard, the description taken with the drawings makes apparent to those skilled in the art how examples of the disclosure may be practiced.

In the drawings.

DETAILED DESCRIPTION

The disclosure below uses interchangeably the terms antennas, conductors, conductive lines, conductive traces or similar terms, all related to conductive lines or areas patterned on a surface and used for detecting stylus or touch using capacitive coupling.

Various sensor types may be used for assessing the pressure level exerted at a tip of a stylus by a user. In some examples, an optical sensor may be used, comprising a light source, a photo detector and an element therebetween, such that the amount of light received by the photo detector depends on the relative locations of the components. When pressure is applied at the tip of the stylus, the relative locations change such that more (or less) light is received by the photodetector, leading to reporting of higher pressure levels.

However, other pressure sensing mechanisms may also be used. Some examples of the disclosure relate to a solution in which the capacitance of a capacitor changes when the pressure applied at the stylus tip changes.

The disclosed methods and examples provide for sensing the pressure applied at a stylus tip using a variable capacitor that changes its capacitance responsive to the applied pressure. The disclosed examples utilize a circuit and provide for replacing an existing mechanism such as an optical mechanism with a capacitive mechanism while keeping the rest of the circuit as is. The capacitive mechanism can be utilized in other environments in which such constraints may not exist. The methods and examples described herein may also be used for measuring other physical quantities by translating them to capacity.

According to an aspect of the disclosure there is provided a stylus with a stylus tip that is electrically isolated from a user touching the stylus while the tip is hovering over a detection surface and electrically connected to a user touching the stylus while the tip is touching the detection surface. In some examples, switching between electrically isolating and electrically connecting the stylus improves discrimination between hover and touch.

According to an aspect of the disclosure, there is provided a stylus including a circuit that can sense pressure with a variety of different pressure sensing mechanisms. In some examples, a circuit applied for sensing pressure based on optical detection of axial tip movement is applied for sensing pressure with a capacitive based sensor or with a resistive based sensor. According some examples, the stylus tip switches from being electrically isolated from a user's touch when no pressure is applied on the tip to being electrically connected to a user's touch when pressure is applied on the tip. Optionally, the switching helps discriminate between hover and touch of a stylus.

Figure 1:
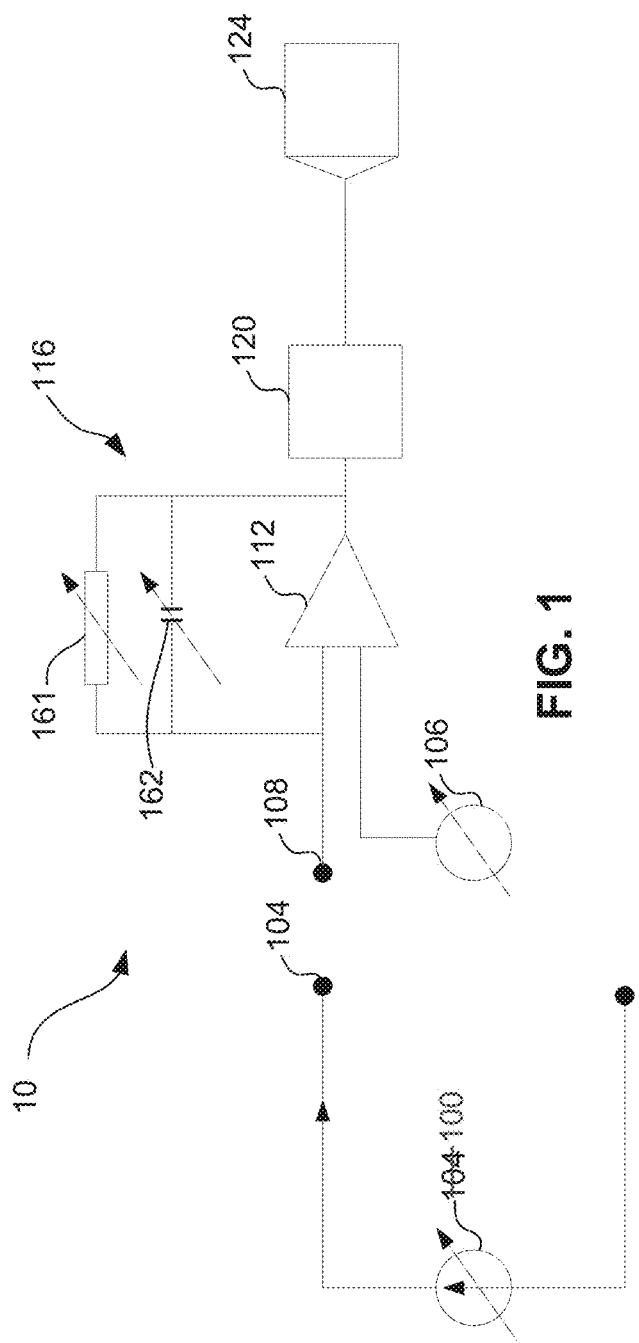
FIG. 1 shows a schematic circuit of a framework into which a capacitance sensing circuit may be embedded in accordance with some examples of the present disclosure.

Referring now to the drawings, FIG. 1 shows a framework into which a capacitance sensing circuit may be embedded. The circuit 10 includes a variable current source 100. In examples in which the pressure sensing is optical, this source may be used for driving a LED connected to point 104, wherein point 104 connects to an anode of the LED. The circuit further comprises a TransImpedance Amplifier (TIA) 112, which when used in an optical system is designed to receive current from the photo detector at a point 108 and translate it to voltage. Optionally, the other input to TIA 112 is a variable input offset voltage (Vos var) 106.

The circuit contains variable gain and voltage offset 116 for TIA 112, controlled by changing variable resistor (Rvar) 161. By increasing the gain, the sensor sensitivity may be increased. For a capacitive based sensor, the same capacitance change of the pressure sensor will cause higher voltage change in TIA 112 output and higher output change of the analog to digital converter (ADC) 124 when increasing the gain of TIA 112. The voltage offset is used to match the variable voltage range of TIA 112 output to the operative ranged of TIA 112 and ADC 124.

At low frequencies, the variable resistor (Rvar) 161 may define the gain. At higher frequencies, variable resistor 161 and variable capacitor (Cvar) 162 combination defines the frequency response of TIA 112 output: Vout=−i*Zfeedback, wherein Zfeedback==RµXc wherein Xc is the impedance of the (Cvar) 162.

The output of TIA 112 is input into sample and hold circuit 120 having variable gain and offset, and then to ADC 124.

The circuit may undergo a calibration process at manufacturing time to compensate for production tolerances, and on-the-fly calibration (OTFC) for compensating sensor drifts.

In order to adapt circuit 10 for using alternative pressure sensing mechanisms, the current source may be adapted to drive a variable capacitor. TIA 112 interface may be adapted to measure the voltage created after a predefined period of time from the rising edge of the driving pulse of the sensor. The pressure applied on the stylus may be estimated according to this created voltage. Alternatively, time required for creating a predetermined voltage may be measured and used for assessing the pressure.

In some examples, the circuit may be designed such that increasing the driving pulse will increase the ADC output. In other examples, the circuit may be designed the other way around, such that increasing the driving pulse amplitude will decrease TIA 112 output voltage. The specific choice depends on design considerations.

In some examples, the pressure sensor may be a variable capacitor. The variable capacitor may vary in response to the movement of a conductive elastomer member of the stylus.

Figure 2:
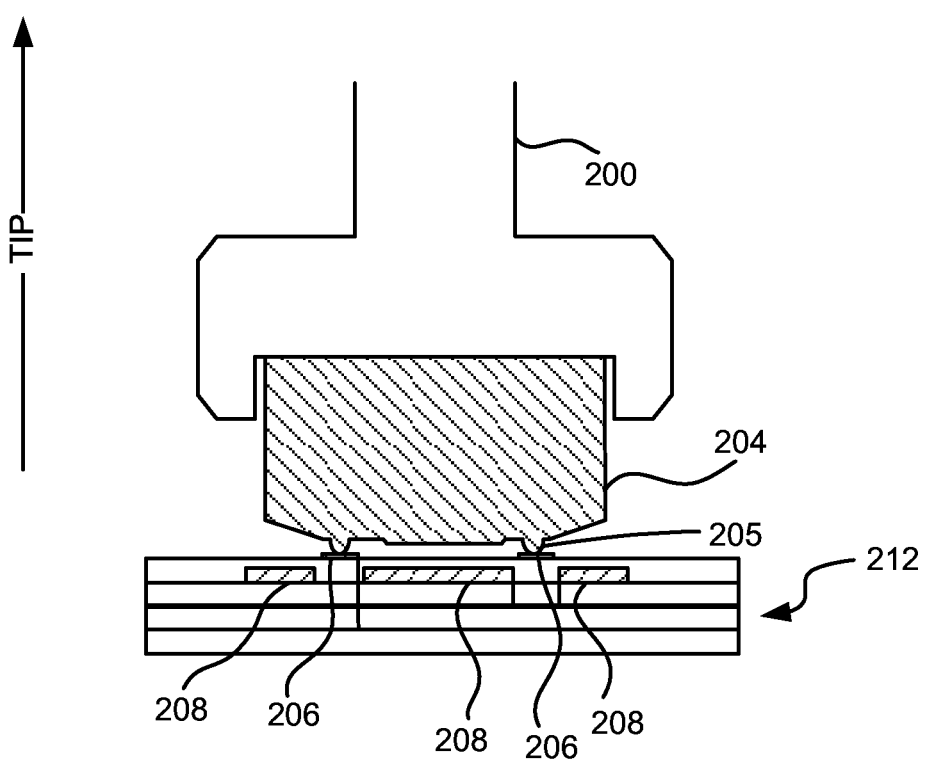
FIG. 2 shows an example of a stylus in which the capacitance changes in accordance with pressure applied at a stylus tip, in accordance with some examples of the present disclosure.

Referring now to FIG. 2, showing an example of a stylus in which the capacitance changes in accordance with pressure applied at a stylus.

The stylus comprises an isolator 200 that recedes together with the tip if pressure is applied at the tip, or advances together with the tip when pressure stops. Isolator 200 keeps the tip potential isolated from the variable capacitor detailed below.

Tip holder 200 supports a conductive elastomer 204, made for example of conductive rubber that deforms in response to pressure. Elastomer 204 has a continuous circular protrusion 205 (or a multiplicity of bumps) which deform first as pressure is applied at the tip.

The stylus further comprises electrode 206 that is ring shaped, which may be made for example of copper, and may be at the same potential as circular protrusion 205.

The stylus further comprises an electrode 208 comprising a disk and circle. Electrode 208 is stationary with respect to the stylus housing.

Elastomer 204 is a moving electrode and is at the same potential as protrusion 205, while electrode 206 and electrode 208 are stationary with respect to the stylus housing. Capacitance between elastomer 204 and electrode 208 changes due to elimination of the air gap and the deformation of elastomer 204 which extends its effective area. Electrode 206 may be placed on the external layer of printed circuit board assembly (PCBA) 212 and exposed to conductively touch protrusion205, while electrode 208 may be embedded within PCBA 212. The FR4 of the PCB forms a dielectric layer between these two electrodes.

The stylus may be designed such that electrode 206 and electrode 208 do not overlap. This configuration reduces the static capacitance between electrode 206 and electrode 208, thus increasing the relative change caused by pressure.

The capacitance may be affected by the size of the elastomer 204, electrode 206, and electrode 208, by the initial distance between the electrodes, and the capacitance changes resulting from the response of the elastomer to the pressure, the stylus material and additional mechanical factors. Specifically, the thickness of the FR4 between electrode 206 and touch electrode 208 has a significant effect on the capacitance.

In order to increase sensitivity, the initial distance between electrode 206 and electrode 208 may be reduced. Alternatively or additionally, the isolating layer, such as FR4 layer between electrode 206 and electrode 208 may be selected to have a dielectric coefficient above a defined threshold.

In the shown configuration, the capacitance increases as the pressure increases. The example shown in FIG. 2 above is exemplary only, and different configurations may be suggested, each representing a tradeoff between factors such as manufacturability, cost, sensitivity or others.

Figure 3:
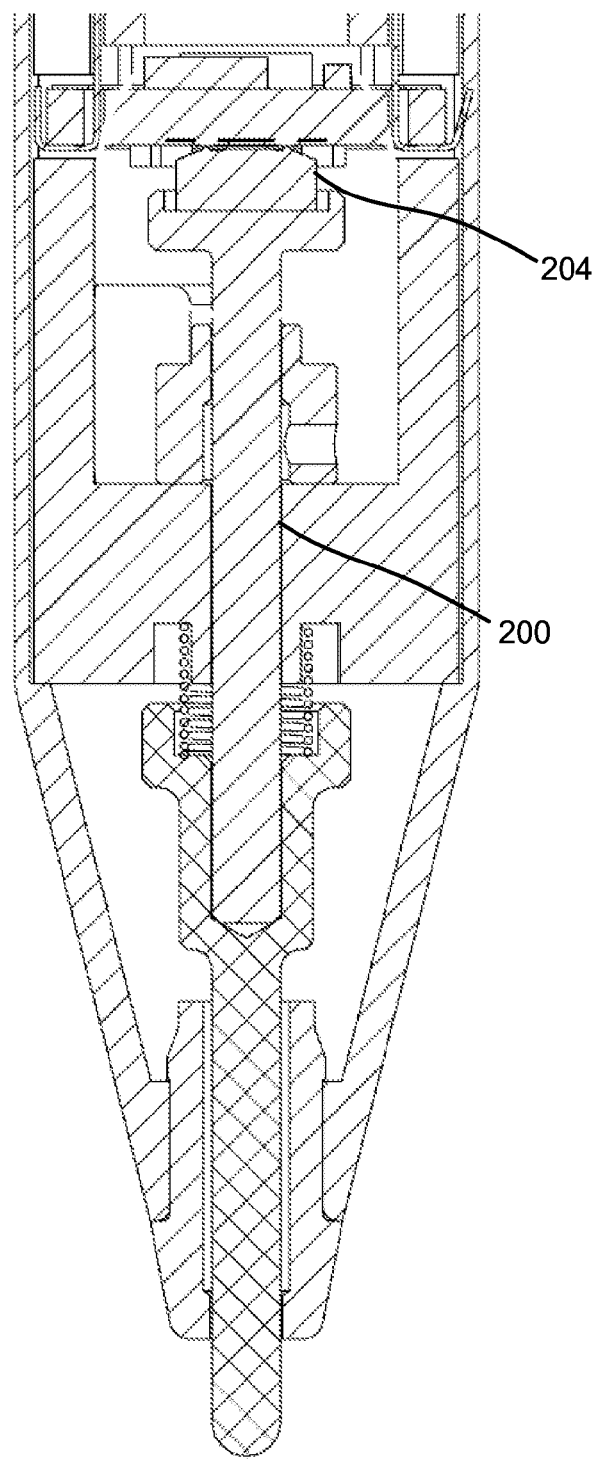
FIG. 3 shows an isolator and an elastomer as embedded within a stylus, in accordance with some examples of the present disclosure.

FIG. 3 shows isolator 200 and elastomer 204 as embedded within a stylus.

Figure 4A:
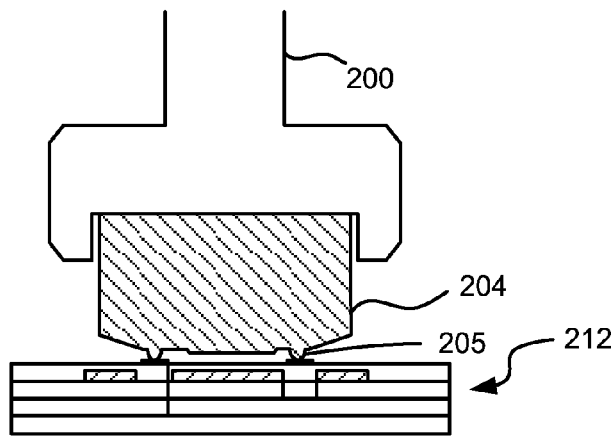
FIGS. 4A, 4B and 4C show the boundary of the elastomer as it deforms in response to increasing pressure, in accordance with some examples of the present disclosure.
Figure 4B:
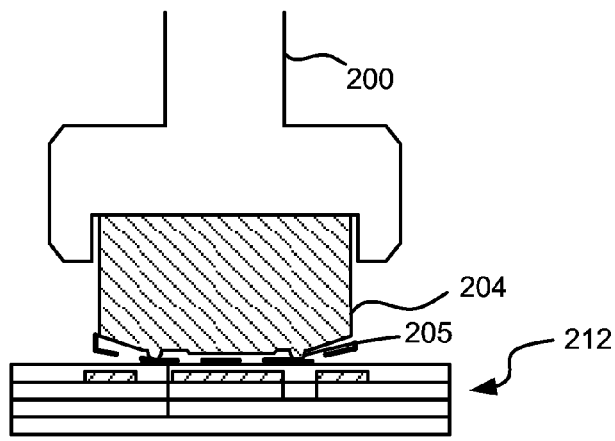
Figure 4C:
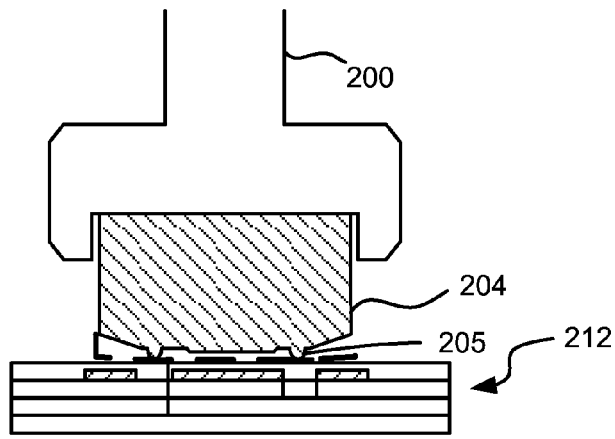

FIGS. 4A, 4B and 4C show the boundary of the elastomer as it deforms in response to increasing pressure. The black dashed lines show the boundary of the elastomer as it deforms in response to increasing pressure. First, as the bumps are pressed, less air is trapped between the capacitor sides. This scenario causes an increase in the average dielectric coefficient of the capacitor, which in turn increases the capacitance as the pressure increases. Even during this initial phase, the most sensitive response is at the initiation of the touch, due to the small area of the bumps. When pressure increases further, the bumps 205 become harder to press, and with further pressure elastomer 204 itself is deformed as the bottom of elastomer 204 flattens against the PCBA 212. Thus, during all these stages, the area of the formed capacitor increases and less air is trapped between the capacitor sides, further increasing the capacitance. This multi-stage capacitance change may be used for providing a highly sensitive non-linear response to pressure. This highly sensitivenon-linear response may be used for discriminating between hover and tip states of the stylus, and provide further changing behavior when more pressure is applied. Due to the structure of elastomer 204, during bump 205 deforming stage the capacitor effective area increases proportionally to the square of the bump radius. Additionally, as pressure increases, the gap between the capacitor sides contains less air and more FR4. FR4 has higher dielectric coefficient, thus further increasing capacitance.

Figure 5:
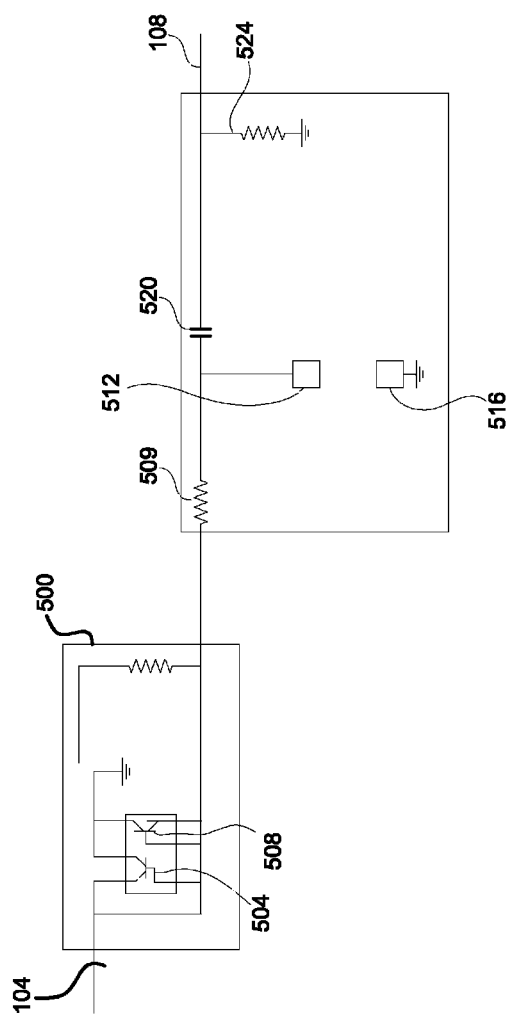
FIG. 5 shows an exemplary electronic circuit for using variable capacitance for determining pressure applied at the tip, in accordance with some examples of the present disclosure.

FIG. 5 shows an exemplary electronic circuit designed for using variable capacitance for determining the pressure applied at the tip. The circuit may connect between points 104 and 108 of FIG. 1, instead of a light source and a photo detector.

The circuit includes a current mirror 500 including transistor 504 and transistor 508. Current mirror 500 is designed to invert the pulse polarity. This may be required in order to satisfy the requirements set above, namely, that higher amounts of light detected by the photo detector implies lesser pressure applied at the tip. Alternatively, this effect may be achieved by changing the direction of the calibration compensation. If the requirements set above are not set, current mirror 500 may be omitted. Further alternatives may exist as well.

Resistor 509 determines the current that is drained from current mirror 500. This partial current is used for estimating the change due to the change in the relative location of an electrode connected to pad 512 and an electrode connected to pad 516. The system can then estimate the pressure applied at the tip that caused the electrode connected to the pads to assume the distance.

The larger the capacitance between the electrode connected to pad 512 (pad 1) and the electrode connected to pad 516 (pad 2), the smaller the signal that will be provided to amplifier 112, and the smaller the output, as may be desired.

Pad 512 and pad 516 may be connected to electrode 206 and electrode 208 respectively of FIG. 2.

Capacitor 520 and resistor 524 may be used for matching the input impedance to amplifier 112.

Figure 6:
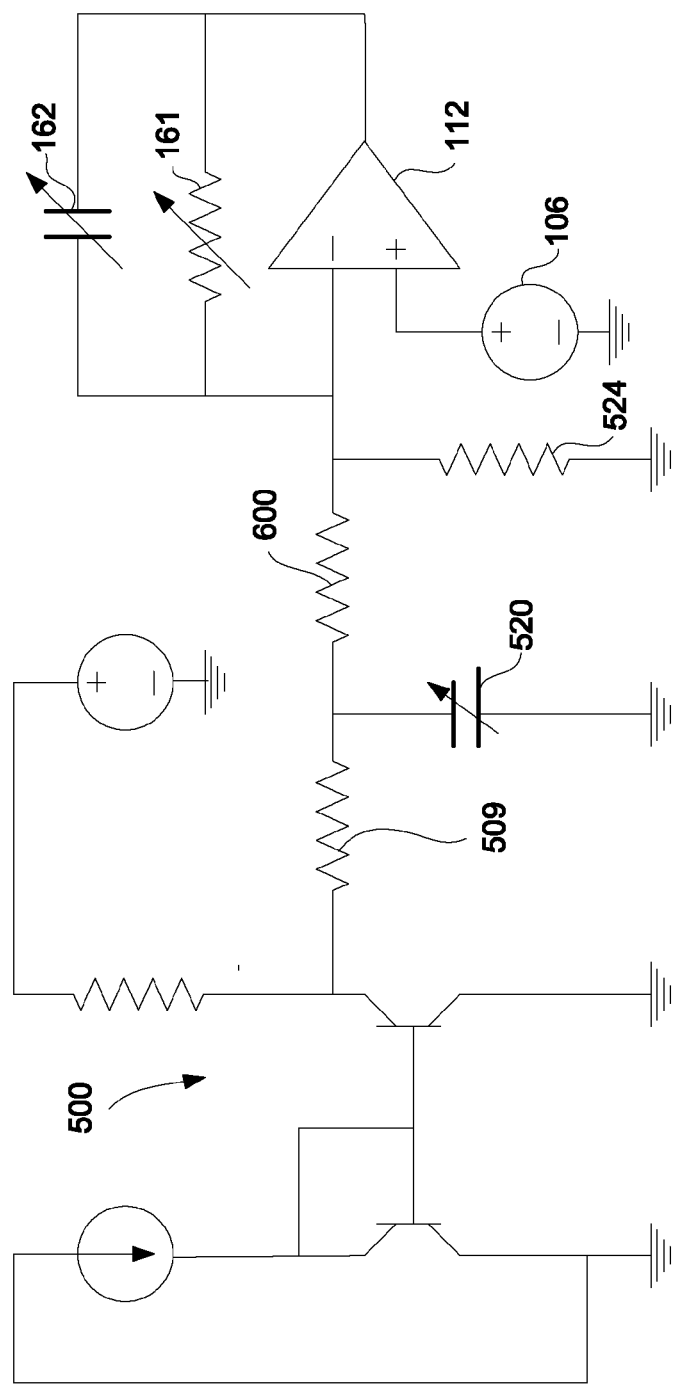
FIG. 6 shows a detailed schematic of the circuit of FIG. 5 for determining pressure applied at a tip, in accordance with some examples of the present disclosure.

FIG. 6 shows a more detailed schematic of the circuit. In this example, capacitor 520 is replaced by resistor 600.

Figure 7:
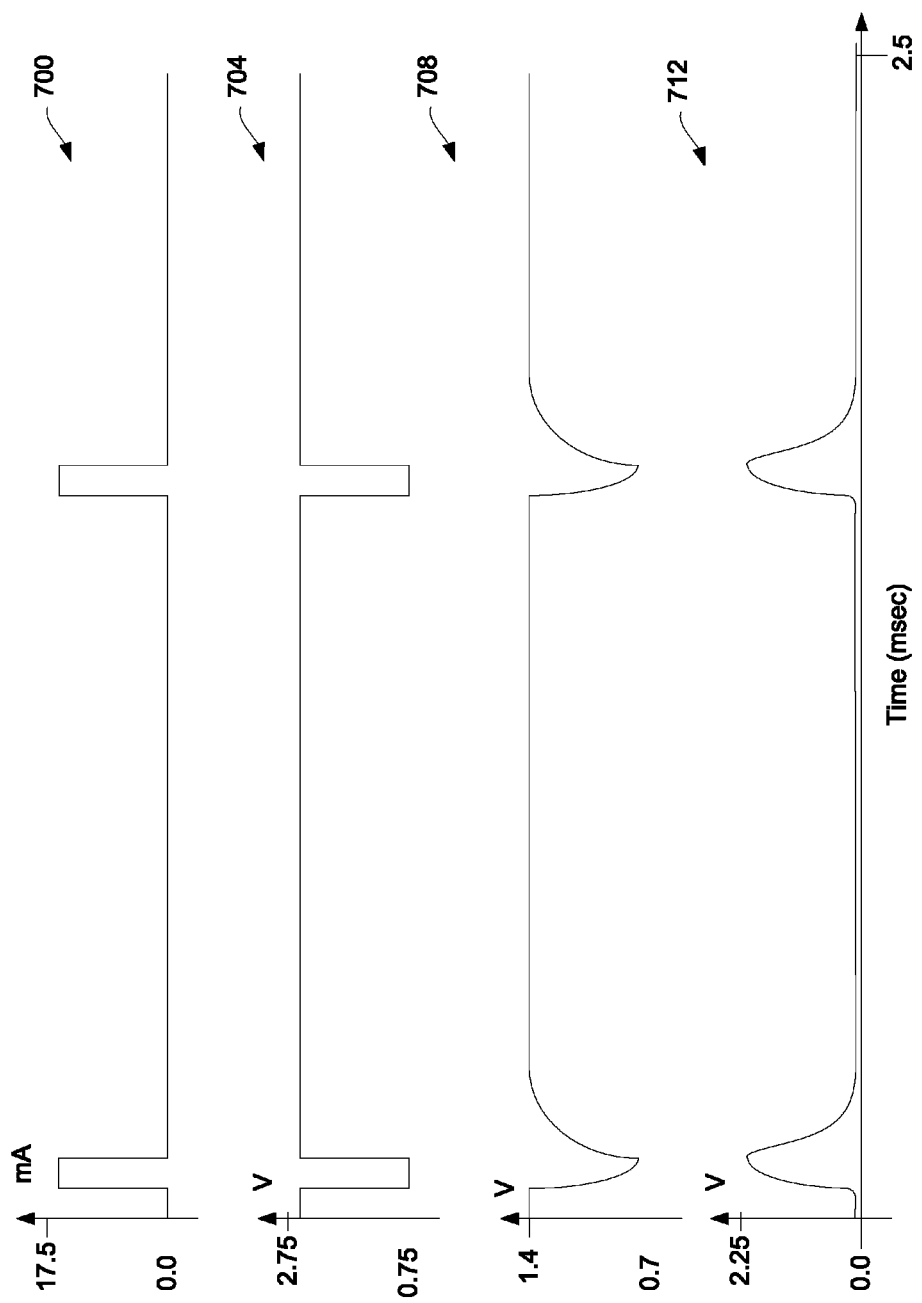
FIG. 7 shows the general behavior of the circuit, wherein the input signal and the distance between the pads are constant, in accordance with some examples of the present disclosure.

Reference is now made to FIG. 7 showing the general behavior of the circuit, wherein the input signal (point 104) is constant and the distance between the pads is constant.

Graph 700 shows the input signal at point 104, and graph 704 shows the signal as inverted by current mirror 500. Graph 708 shows the signal after resistor 509, and graph 712 shows the signal as output by TIA output.

Figure 8:
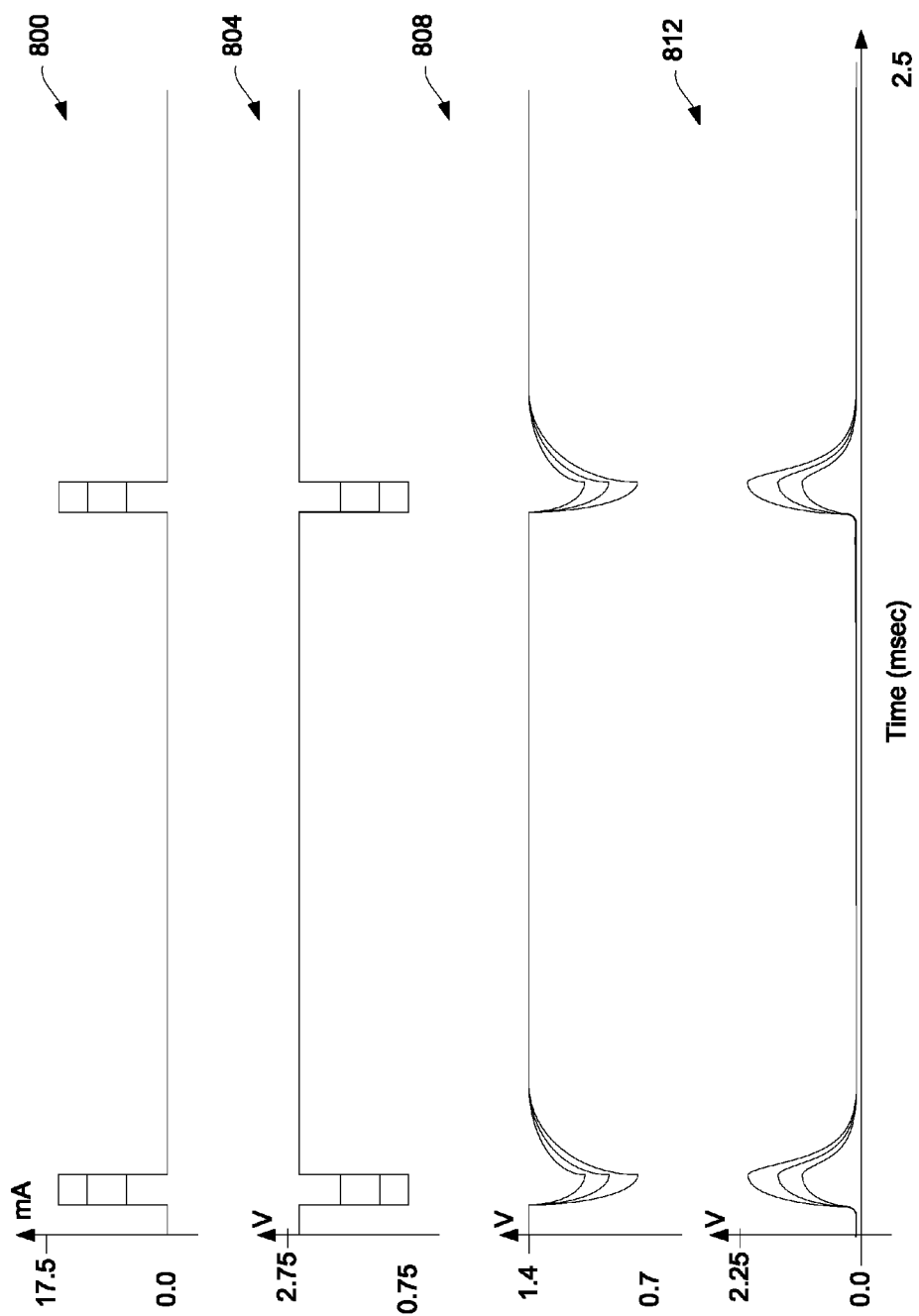
FIG. 8 shows the general behavior of the circuit, wherein the input signal changes and the distance between the pads is constant, in accordance with some examples of the present disclosure.

Reference is now made to FIG. 8 showing the general behavior of the circuit, wherein the input signal changes between three degrees, and the distance between the pads is constant.

Graph 804 shows three increasing input signals at point 104, and graph 808 shows the corresponding decreasing signals as inverted by current mirror 500. Graph 812 shows the signals after resistor 509 which are also decreasing, and graph 816 shows the increasing signals as output by ADC 124. Thus, increasing the input without changing the capacity increases the output as well.

Figure 9:
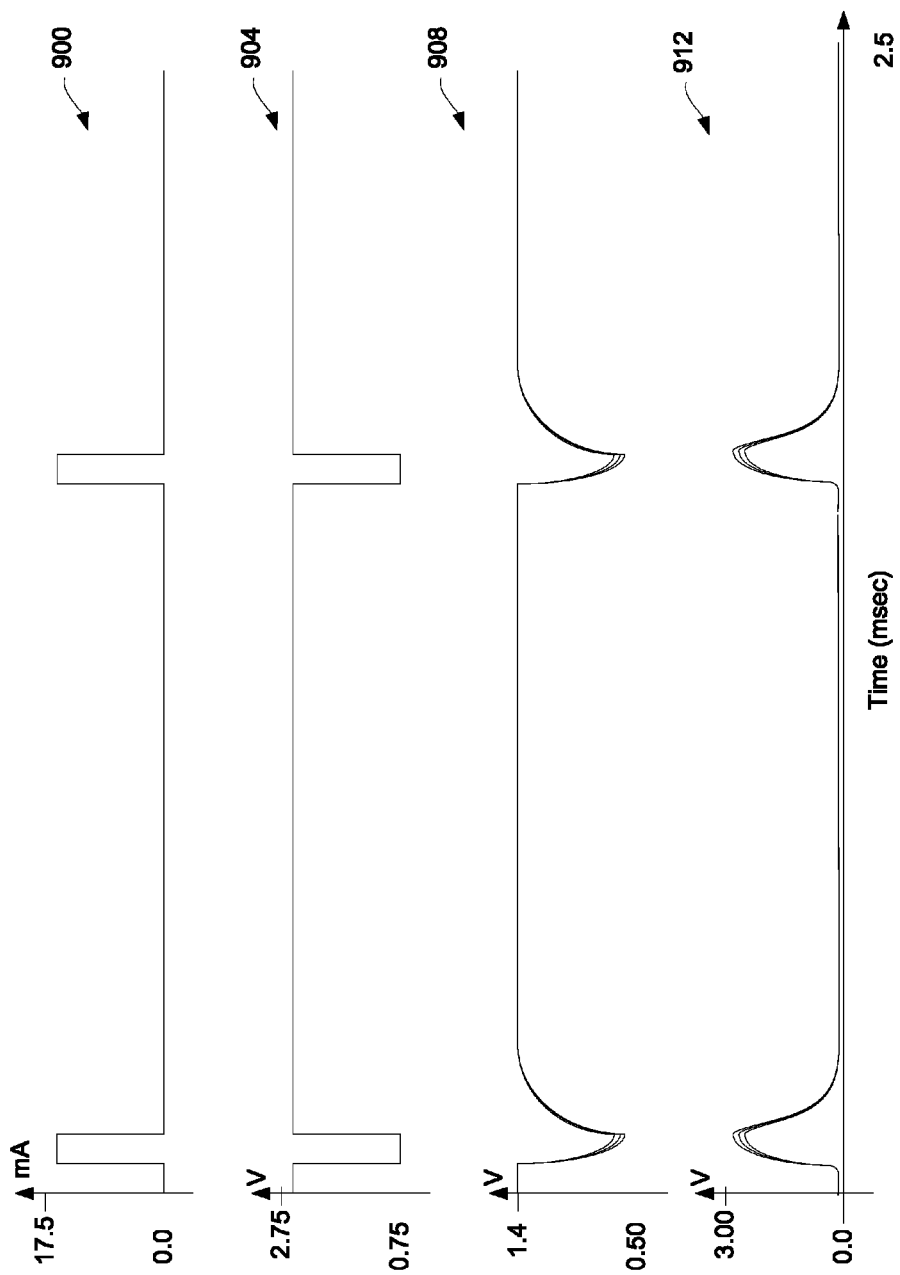
FIG. 9 shows the general behavior of the circuit, wherein the input signal is constant and the distance between the pads changes, in accordance with some examples of the present disclosure.

Reference is now made to FIG. 9 showing the general behavior of the circuit, wherein the input signal is constant and the pressure applied at the tip and changes the distance between the pads varies between three degrees.

Graph 904 shows the constant input signal at point 104, and graph 908 shows the corresponding decreasing signal as inverted by current mirror 500. Graph 912 shows the signals after resistor 509 which increase as the pressure level increases, and graph 916 shows the decreasing signals as output by ADC 124. Thus, increasing the pressure without changing the input decreases the output signal.

Figure 10:
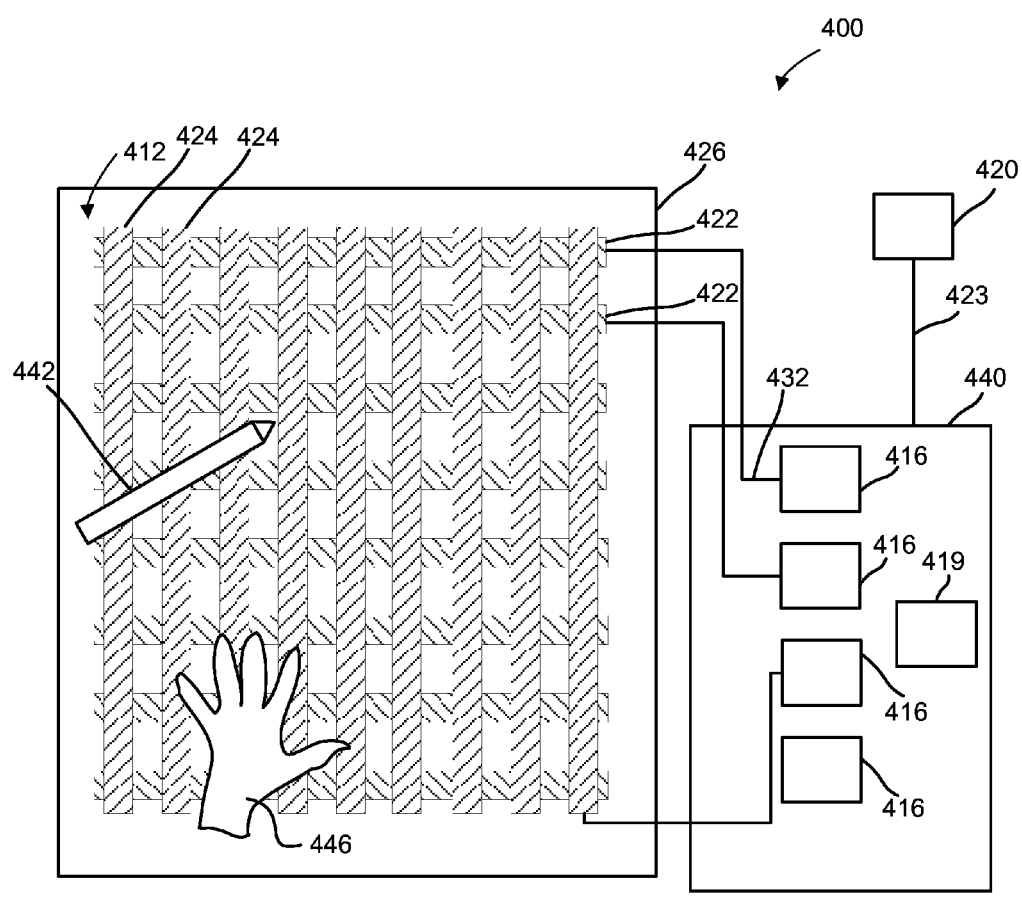
FIG. 10 is a simplified diagram of a digitizer system for use with a stylus, in accordance with some examples of the present disclosure.

Referring now to FIG. 10, showing a simplified block diagram of a digitizer system operative to receive input from a user using a stylus, the digitizer system includes a digitizer sensor in accordance with some examples of the present disclosure. The digitizer system 400 may be suitable for any computing device that enables interactions between a user and the device, e.g. mobile computing devices that include, for example, FPD screens. Examples of such devices include Tablet PCs, stylus enabled lap-top computers, tabletop computer, PDAs or any hand held devices such as palm pilots and mobile phones.

According to some examples of the present disclosure, digitizer system 400 includes a sensor 412 for tracking position of stylus 442 and/or user touch, for example by user hand 446. In some examples sensor 412 includes a patterned arrangement of conductive strips or lines that are optionally arranged in a grid including row conductive strips 422 and column conductive strips 424, also referred to as antennas, traces, lines, or conductors. In some examples, sensor 412 is transparent and is optionally overlaid on a flat panel display (FPD) 426. According to some examples of the present disclosure, sensor 412 is a capacitive based sensor that simultaneous detects a stylus 442 and one or more finger touches 446.

Typically, a circuit is provided on one or more PCBs 440 positioned in proximity to touch sensor 412. Typically, row conductive strips 422 or column conductive strips 424 are connected to PCB 440 via connectors 432. One or more application specific integrated circuit (ASICs) 416 positioned on PCB 440 comprise circuit to sample and process the sensor's output into a digital representation. Digital output is optionally forwarded to a digital unit 419 e.g. a digital ASIC unit mounted also on PCB 440, for further digital processing. Typically, output from digital unit 419 is forwarded to a host 420 via an interface 423 for processing by the operating system or any current application. According to some examples, digital unit 419 also produces and sends a triggering pulse to at least one of the conductive lines, e.g. a trigger pulse with frequency of 10-500 KHz.

According to some examples of the disclosure, digital unit 419 determines and/or tracks the position of stylus 442 as well as other of physical objects, such as finger 446, and/or an electronic tag touching the digitizer sensor from the received and processed signals.

Figure 11A:
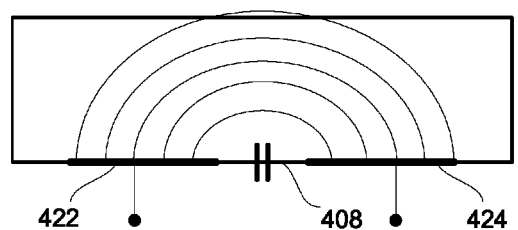
FIGS. 11A-11C are schematic illustrations of capacitance between two antennas and the measured signals when touched with grounded or ungrounded objects, in accordance with some examples of the present disclosure.
Figure 11B:
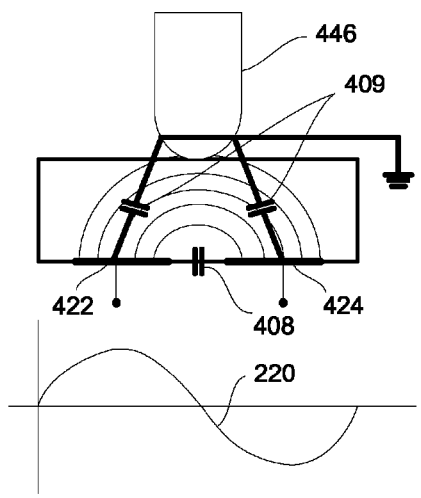
Figure 11B:
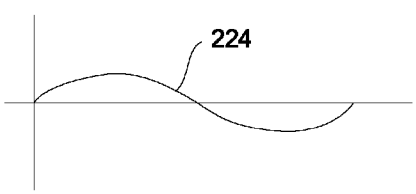
Figure 11B:
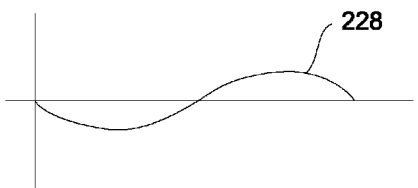
Figure 11C:
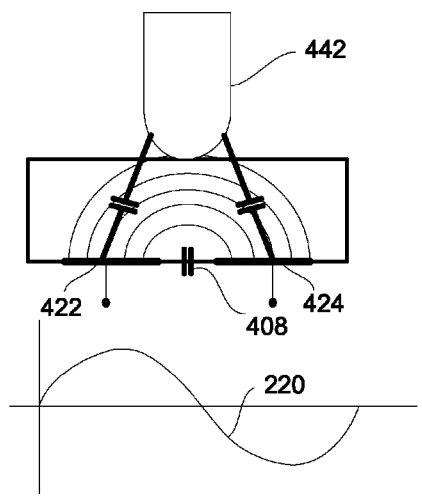
Figure 11C:
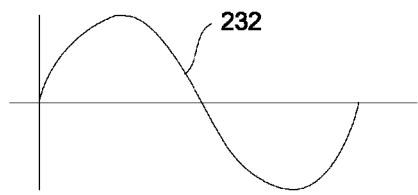
Figure 11C:
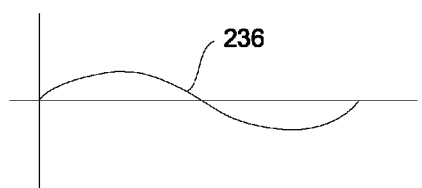

Referring now to FIGS. 11A, 11B and 11C, showing illustrations of the capacitance between two antennas with a finger or a stylus touching the digitizer.

FIG. 11A shows exemplary column conductive strip 424 and exemplary row conductive strip 422. The conductive strips are antennas. When a signal is injected into any of the antennas, for example, column conductive strips 424, a corresponding signal may be created on another conductive strip, for example a row conductive strip 422, due to capacitance 408 formed between the two conductive strips.

The signal measured on the other conductive strip is of smaller amplitude than the injected signal.

FIG. 11B shows exemplary column conductive strip 424 and exemplary row conductive strip 422 with a grounded object such as a finger 446 coupling to the junction formed between the row and column conductive strips. Finger 446, assumed to be grounded, creates capacitance 409 with each of the two conductive strips and thus reduces the signal passing between the conductive strips. The difference between signal a 224 measured when finger 446 touches the digitizer, and a signal 220, which is the signal measured without any object touching the digitizer, is a signal 228 which after being subtracted from the steady state signal (as measured without any object on the screen) has the opposite phase to the phase of signal 220. The resulting signal will decrease in about 5-30% during touch, and will increase in about 1-25% during hover. A signal similar to signal 228, although of different amplitude may be received when touching the digitizer with a conductive object electrically connected to the user, such as a conductive stylus.

FIG. 11C shows exemplary column conductive strips 424 and exemplary row conductive strips 422 with an ungrounded finger size object that can be a passive stylus 442 hovering over or touching the junction therebetween. Ungrounded stylus 442 increases the capacitance between the conductive strips. The difference between signal 232 measured when ungrounded stylus 442 touches the digitizer, and signal 220, which is the signal measured without any object touching the digitizer, is signal 236 which is of the same phase as signal 220.

Thus, making the stylus grounded when in touch with the digitizer, and ungrounded otherwise causes opposite phases of the difference signal and thus provide significant difference in the signal and easy discrimination between the hover and touch states.

Figure 12:
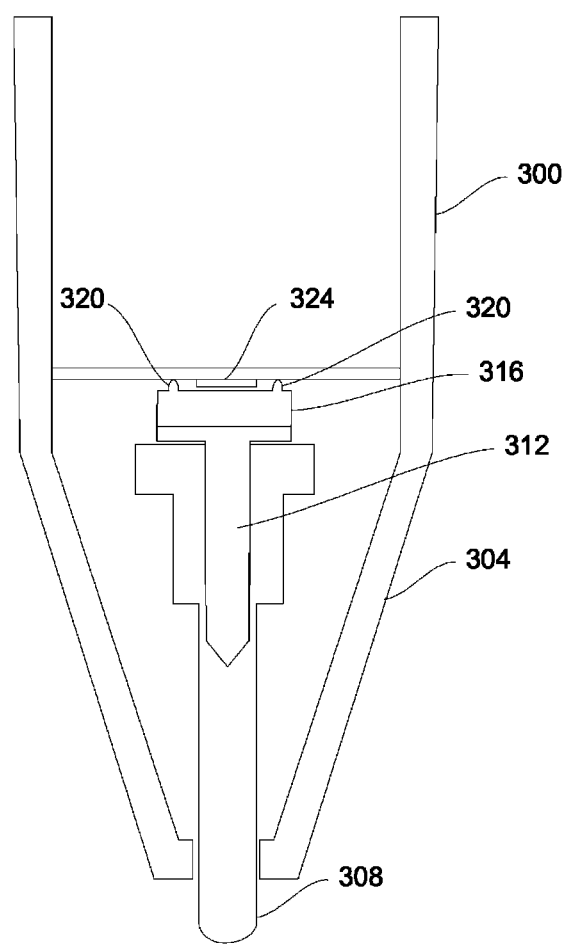
FIG. 12 is a simplified schematic of an exemplary signal transmitting stylus in accordance with some examples of the present disclosure.

Reference is now made to FIG. 12 showing an example of a stylus that is grounded in touch mode and ungrounded otherwise.

The stylus comprises housing 300 made of conductive material, such as iron or another metal, such that when a user holds or touches the housing, the housing is grounded. Housing 300 has attached thereto a conductive member 324.

The stylus further comprises tip 308 made of conductive material such as metal, conductive felt, or the like, and tip holder 304 made of dielectric material such as plastic, silicon, or the like. Tip 308 connects to shaft 312 also made of conductive material, which in turn connects to conductive member 316 made of conductive material such as metal. Conductive member 316 comprises or is connected to one, two or more elastic dielectric protrusions 320, made for example of non-conducive rubber or silicon.

When the user holds the stylus such that tip 308 does not touch any object, conductive member 324 is at a distance from conductive member 316 due to protrusions 320, such that tip 308 is ungrounded. When the user presses tip 308 against an object such as the digitizer, tip 308, shaft 312 and conductive member 316 press protrusions 320. When the pressure exceeds a predetermined threshold, elastic protrusions 320 deform, such that conductive member 316 forms electrical contact with grounded conductive member 324, and thus grounds tip 308.

Conductive member 324 may always at ground potential. In hover, there is no electrical contact between the tip and the housing. Typically, the parasitic capacitance is relatively low.

Because the capacitance between the tip and the sensor is very small due to the small size of the tip, the parasitic capacitance between the tip and the housing should be even smaller to enable hover-touch distinction. The switch may be operative for a passive object such as a passive stylus, or to an active (signal-transmitting) object, although the effect in the case of an active object is lower than in a passive object.

Therefore, when the stylus hovers over the digitizer, tip 308 is ungrounded, resulting in a measured signal such as signal 236 of FIG. 11C. When the stylus touches the digitizer with pressure level exceeding a predetermined threshold, tip 308 becomes grounded, and the measured signal becomes similar to signal 228 of FIG. 11B.

Thus, when the stylus touches an area between junctions rather than directly a junction, it is still differentiated from hover mode due to the stylus being grounded.

The capacitance formed between conductive member 316 and housing 300 increases as they get closer and may become non-negligible at a distance lower than a predetermined threshold. In such situation, the stylus input may be interpreted as "touch" although the stylus does not apply the required pressure in the digitizer.

In order to eliminate such situation, and to calibrate the stylus to be comfortable to the user, the stylus may comprise a calibration mechanism.

Calibration may comprise attaching the moving parts, e.g. member 316 to member 324 with no gaps therebetween to define a touch state. The required force may depend on the mechanical resistance of protrusions 320, which depends on their size, shape and material.

In some calibration methods, conductive member 316 may be moved up and down along shaft 110 by a user moving a knob protruding from tip holder 304. In alternative examples, conductive member 316 may be screwed up and down along shaft 110 using a screw, or the like.

By changing a distance such as a default distance between tip 308 or a member of the stylus electrically connected to tip 308 such as conductive member 316, and housing 300 or a member electrically connected to housing 300, a user may set the stylus to switch from hover to touch mode at a required pressure level.

The present disclosure is not limited to the technical description of the stylus described herein, and may also be applicable to other stylus structures.

For example, the stylus may be designed such that the tip is electrically connected to the housing when no pressure is applied at the tip, or when the pressure applied to the tip is under a predetermined value, and the tip is electrically disconnected from the housing otherwise.

In further examples, other switching mechanisms may be used for electrically connecting and disconnecting the stylus tip from the housing in response to applying or stopping pressure.

The present disclosure may also be applicable to other touch detection methods known in the art.

According to an aspect of the present disclosure there is provided a stylus adapted to be used with a digitized sensor, the stylus comprising: a conductive housing; and a conductive tip, wherein the conducive tip is electrically disconnected from the conductive housing when a level of pressure applied to the stylus tip is below a predetermined value, and the conducive tip is electrically connected to the conductive housing otherwise.

According to an aspect of the present disclosure there is provided a stylus adapted to be used with a digitizer sensor, the stylus comprising: a conductive housing; and a conductive tip, wherein the conducive tip is electrically connected to the conductive housing when a level of pressure applied to the stylus tip is below a predetermined value; and the conducive tip is electrically disconnected from the conductive housing otherwise.

Optionally, the housing has one or more elastic protrusions thereon, such that when pressure is applied to the tip, the elastic protrusions are deformed thus allowing contact between the stylus tip or a member electrically connected thereto, and the stylus housing or a member connected thereto.

Optionally, the stylus comprises a calibration mechanism for setting a distance between the stylus tip or a member electrically connected thereto, and the stylus housing or a member connected thereto when no pressure is applied at the tip.

According to an aspect of the present disclosure there is provided a stylus adapted to be used with a digitized sensor, the stylus comprising: two conductive members isolated from each other, wherein distance between the two conductive members changes responsive to pressure applied at a tip of the stylus; and circuitry for estimating the capacitance formed between the two conductive members due to pressure applied at the tip of the stylus, and for modulating a signal output by the stylus in accordance with the capacitance.

Optionally, the output of the circuitry decreases responsive to increased pressure applied on the tip of the stylus.

Optionally, the stylus comprises an inversion circuitry such that output of the circuitry decreases responsive to increased pressure applied on the tip of the stylus.

Optionally, the response to pressure is non-linear.

Optionally, the non-linearity provides for differentiating hover and tip states of the stylus.

Optionally, the non-linearity provides for differentiating hover and at least two tip states of the stylus.

According to an aspect of the present disclosure there is provided a stylus comprising a capacitance pressure estimation mechanism, the capacitance pressure estimation comprising a sub-circuit containing a variable capacitor, wherein estimating the pressure comprises estimating an impulse response of the sub-circuit.

According to an aspect of the present disclosure there is provided an apparatus comprising: a housing; a tip configured to move with respect to the housing based on contact pressure applied the tip; and a circuit configured to detect pressure applied on the tip based on movement of the tip, wherein the circuit includes: a current source configured to drive a sensor, wherein the current source is variable; a transimpedance amplifier (TIA) configured to receive current from the sensor; and an analog to digital converter configured to sample output from the TIA.

Optionally, amplitude of the output decreases with increase contact pressure applied on the tip.

Optionally, the sensor is a capacitive based sensor configured to vary capacitance based on movement of the tip.

Optionally, the capacitive based sensor includes a first electrode of the capacitor that moves with respect to a second electrode based on the movement of the tip.

Optionally, the capacitive based sensor includes a deformable electrode that deforms based on the contact pressure applied on the tip.

Optionally, the deformable electrode is an elastomer formed with a protrusion.

Optionally, the deformable electrode is formed with at least one protrusion.

Optionally, the capacitive based sensor comprises:
a first electrode coated with solid dielectric layer, wherein a portion of the dielectric layer is patterned with a conductive pad that is exposed;
a second electrode formed at least in part with elastic material, wherein the second electrode contacts the conductive pad patterned on the dielectric layer; and
a support element that moves together with the tip of the stylus and presses against the second electrode in response to pressure applied on the tip.

Optionally, the first electrode is embedded in a PCBA and the conductive pad is patterned on a surface of the PCBA.

Optionally, the first electrode is patterned on a first layer of the PCBA and the dielectric layer is a second layer of the PCBA, which coats the first layer of the PCBA.

Optionally, the PCBA is fixed to the housing.

Optionally, the second electrode is supported by the support element that that moves together with the tip.

Optionally, the capacitive based sensor is associated with a sub-circuit including: a current mirror configured to invert a pulse polarity of the current source; and a resistor configured to detect current drained from the current mirror.

Optionally, the sub-circuit comprises a capacitor and resistor configured to match input impedance to the TIA.

Optionally, the sensor is selected from a group including: a capacitive based sensor, a resistive based sensor and an optical sensor.

Optionally, the circuit includes a variable gain and voltage offset for the TIA.

Optionally, the variable gain and voltage offset is adjusted based on the sensor.

Optionally, the output based on the movement of the tip is non-linear.

Optionally, both the housing and the tip include a conductive portion and wherein the tip is configured to be electrically connected to the conductive portion of the housing based on contact pressure being below a defined threshold.

Optionally, the tip is configured to be electrically disconnected to the conductive portion of the housing based on contact pressure being above the defined threshold.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Certain features of the disclosure, which are, for clarity, described in the context of separate examples, may also be provided in combination in a single example. Conversely, various features of the disclosure, which are, for brevity, described in the context of a single example, may also be provided separately or in any suitable sub-combination or as suitable in any other described example of the disclosure. Certain features described in the context of various examples are not to be considered essential features of those examples, unless the example is inoperative without those elements.

What is claimed is:

1. An apparatus comprising:
a housing;
a tip configured to move with respect to the housing based on contact pressure applied the tip;
a capacitive based sensor configured to vary capacitance based on movement of the tip, wherein the capacitive based sensor is associated with a sub-circuit including:
a current mirror configured to invert a pulse polarity of the current source; and
a resistor configured to detect current drained from the current mirror; and
a circuit configured to detect pressure applied on the tip based on movement of the tip, wherein the circuit includes:
a current source configured to drive the sensor, wherein the current source is variable;
a transimpedance amplifier (TIA) configured to receive current from the sensor; and an analog to digital converter configured to sample output from the TIA.

2. The apparatus of claim 1, wherein amplitude of the output decreases with increase contact pressure applied on the tip.

3. The apparatus of claim 1, wherein the capacitive based sensor includes a first electrode of the capacitor that moves with respect to a second electrode based on the movement of the tip.

4. The apparatus of claim 1, wherein the capacitive based sensor includes a deformable electrode that deforms based on the contact pressure applied on the tip.

5. The apparatus of claim 4, wherein the deformable electrode is an elastomer formed with a protrusion.

6. The apparatus of claim 5, wherein the deformable electrode is formed with at least one protrusion.

7. The apparatus of claim 1, wherein the capacitive based sensor comprises:
   a first electrode coated with solid dielectric layer, wherein a portion of the dielectric layer is patterned with a conductive pad that is exposed;
   a second electrode formed at least in part with elastic material, wherein the second electrode contacts the conductive pad patterned on the dielectric layer; and a support element that moves together with the tip of the apparatus and presses against the second electrode in response to pressure applied on the tip.

8. The apparatus of claim 7, wherein the first electrode is embedded in a printed circuit board assembly (PCBA) and the conductive pad is patterned on a surface of the PCBA.

9. The apparatus of claim 8, wherein the first electrode is patterned on a first layer of the PCBA and the dielectric layer is a second layer of the PCBA, which coats the first layer of the PCBA.

10. The apparatus of claim 8, wherein the PCBA is fixed to the housing.

11. The apparatus of claim 7, wherein the second electrode is supported by the support element that that moves together with the tip.

12. The apparatus of claim 1, wherein the sub-circuit comprises a capacitor and resistor configured to match input impedance to the TIA.

13. The apparatus of claim 1, wherein the circuit includes a variable gain and voltage offset for the TIA.

14. The apparatus of claim 1, wherein the variable gain and voltage offset is adjusted based on the sensor.

15. The apparatus of claim 1, wherein the output based on the movement of the tip is non-linear.

16. The apparatus of claim 1, wherein both the housing and the tip include a conductive portion and wherein the tip is configured to be electrically connected to the conductive portion of the housing based on contact pressure being below a defined threshold.

17. The apparatus of claim 16, wherein the tip is configured to be electrically disconnected to the conductive portion of the housing based on contact pressure being above the defined threshold.

* * * * *